United States Patent
Hayashi et al.

(10) Patent No.: US 7,242,666 B2
(45) Date of Patent: Jul. 10, 2007

(54) MOBILE PACKET COMMUNICATIONS SYSTEM, MOBILE PACKET COMMUNICATIONS METHOD, AND RADIO NETWORK CONTROLLER

(75) Inventors: Takahiro Hayashi, Yokosuka (JP); Yoshihiro Ishikawa, Yokosuka (JP); Sung Uk Moon, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1084 days.

(21) Appl. No.: 10/201,076

(22) Filed: Jul. 24, 2002

(65) Prior Publication Data
US 2003/0021288 A1 Jan. 30, 2003

(30) Foreign Application Priority Data
Jul. 25, 2001 (JP) ............................. 2001-224867

(51) Int. Cl.
*H04Q 7/38* (2006.01)
(52) U.S. Cl. ...................................... 370/230; 370/252
(58) Field of Classification Search ................ 370/230, 370/252, 328
See application file for complete search history.

(56) References Cited

U.S. PATENT DOCUMENTS

| | | | |
|---|---|---|---|
| 5,757,772 A | 5/1998 | Thornberg et al. | |
| 6,240,452 B1 | 5/2001 | Welch, Jr. et al. | |
| 6,950,656 B1* | 9/2005 | Bahk et al. ................. | 455/436 |
| 2003/0206537 A1* | 11/2003 | Choi et al. .................. | 370/333 |
| 2004/0203450 A1* | 10/2004 | Cho ........................ | 455/67.11 |
| 2004/0203807 A1* | 10/2004 | Bl et al. ..................... | 455/450 |
| 2006/0052103 A1* | 3/2006 | Mikoshiba et al. ...... | 455/435.3 |

FOREIGN PATENT DOCUMENTS

| | | |
|---|---|---|
| EP | 0 913 968 | 5/1999 |
| JP | 2-214243 | 8/1990 |
| JP | 4-179337 | 6/1992 |
| JP | 6-164621 | 6/1994 |
| JP | 7-87096 | 3/1995 |
| JP | 10-84386 | 3/1998 |
| JP | 11-234733 | 8/1999 |

OTHER PUBLICATIONS

F. Khan, et al., IEEE 6Th. International Conference on Universal Personal Communications Record, vol. 1, conf. 6, pp. 134-140, XP-000871723, "Distributed-Queuing Call Admission Control in Wireless Packet Communications", Oct. 12, 1997.

* cited by examiner

*Primary Examiner*—Melvin Marcelo
(74) *Attorney, Agent, or Firm*—Oblon, Spivak, McClelland, Maier & Neustadt, P.C.

(57) ABSTRACT

For utilization of advantage of mobile packet communications to have an improved efficiency in use of radio channel resources, while limiting increase in transmission delay to prevent degradation of quality, a memory (33) is configured to store information on currently set packet calls, a new call decider (32) is implemented, upon reception of a setup request of a packet call transmitted from a mobile station (10), to make a decision depending on the information stored in the memory, as to whether or not the packet call setup-requested is a new call, and an admission concluder (32) is implemented, upon a decision for the packet call to be the new call, to conclude whether or not to admit the packet call.

12 Claims, 8 Drawing Sheets

MOBILE PACKET COMMUNICATIONS SYSTEM, MOBILE PACKET COMMUNICATIONS METHOD, AND RADIO NETWORK CONTROLLER

CROSS REFERENCE TO RELATED APPLICATIONS

This application is based upon and claims the benefit of priority from the prior Japanese Patent Application No. P2001-224867, filed on Jul. 25, 2001; the entire contents of which are incorporated herein by reference.

BACKGROUND OF THE INVENTION

1. Field of the Invention

This invention relates to a mobile packet communications system, a mobile packet communications method, and a radio network controller that are adapted to provide a packet communications service to mobile stations.

2. Description of the Relevant Art

A typical mobile packet communications system employs, in view of the efficiency in use of frequency as well as a permissible delay in the packet communications, a method of time-multiplexing data of a plurality of users in a single radio channel. In this mobile packet communications system, which has as equipment to its radio base station or radio network controller a user data buffer provided every user for temporary storage of data of the user, the limit in amount of data that can be stored in the user data buffer does constitute a hardware-dependent limitation to the number of concurrently connectable users, that is, the number of concurrently settable packet calls (calls for packet communications).

In the typical mobile packet communications system, however, the user data buffer has a sufficient region secured for data storage thereto, which could admit packet calls as setup-requested from users until the user data buffer fills up. In such situation, it is regarded as a problem that increased transmission delay causing a degraded quality occurs.

For solution of this problem, in a known mobile packet communications system, the setup of packet call setup-requested from user is controlled not for admission up to a limit of hardware, but for admission in dependence on the condition of use of down-link transmission power.

Figure 1:
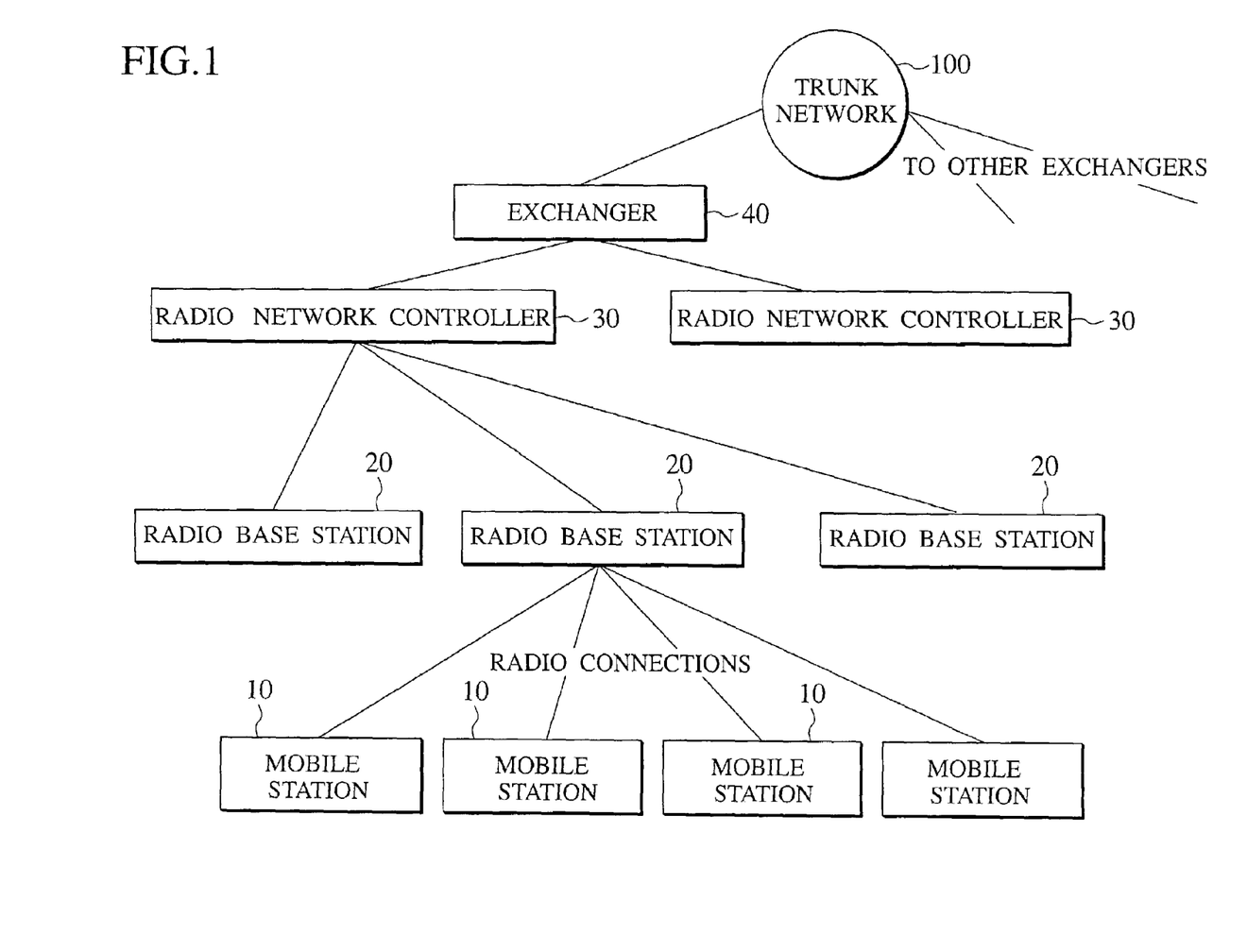
FIG. 1 is a diagram of a mobile packet communications system according to an embodiment of the invention.

An entire configuration of the mobile packet communications system is shown in FIG. 1. This mobile packet communications system is configured, as shown in FIG. 1, with mobile stations 10, radio base stations 20, radio network controllers 30, and an exchanger 40.

Each mobile station 10, connected by a radio connection to a radio base station 20, is configured with a radio communications terminal, such as a portable telephone terminal (with an IMT-2000 conforming portable telephone terminal inclusive), or a portable information terminal (PDA).

Each radio base station 20, connected by radio connections to mobile stations 10, is connected by a wired connection or radio connection to a radio network controller 30. Radio base station 20 is controlled by radio network controller 30, for radio communications with mobile stations 10 residing within a cell region under own control.

Each radio network controller 30 is connected to the exchanger 40 and to radio base stations 20, and controls the radio base stations 20 to control radio communications of mobile stations 10. Radio network controller 30 receives a "call admission request (setup request of packet call)" from a mobile station 10, as it is transmitted via a radio base station 20, and performs a decision of whether or not to admit packet call for the admission request, and upon a decision for admission of packet call, transfers to the exchanger 40 a request for the setup of packet call.

Figure 2:
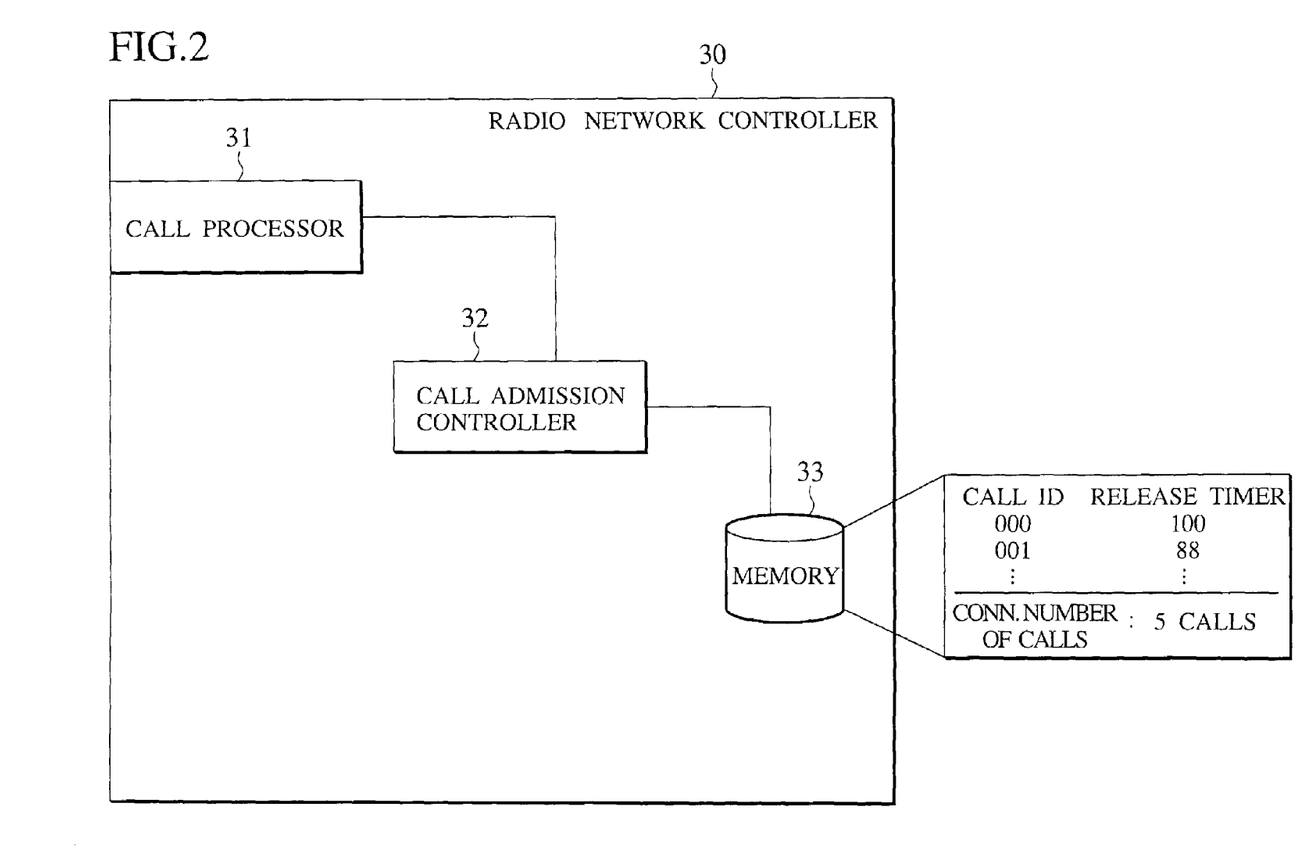
FIG. 2 is a functional block diagram of a radio network controller of a mobile packet communications system according to conventional art.

FIG. 2 diagrams simply part of configuration of radio network controller 30 associated with the above-noted control in the mobile packet communications system described. As shown in FIG. 2, radio network controller 30 is configured with a call processor 31, a call admission controller 32, and a memory 33.

The call processor 31, connected to the call admission controller 32, receives a call admission request from mobile station 10 and transfers the same to the call admission controller 32. Further, the call processor 31 answers the mobile station 10 of a result of a decision transmitted from the call admission controller 32 as to whether or not to admit packet call for the above-noted call admission request.

The call admission controller 32, connected to the call processor 31, decides whether or not to admit packet call for the call admission request transferred from the call processor 31, and transmits a result of the decision to the call processor 31. The call processor 31 is periodically reported from radio base station 20 of "down-link transmission power P" in current use at the radio base station 20. The call admission controller 32, holding a "prescribed threshold T", performs a decision of whether or not to admit packet call for the call admission request transferred from the call processor 31, depending on a result of comparison of the "down-link transmission power P" and the "prescribed threshold T".

The memory 33, connected to the call admission controller 32, stores therein information on currently set packet calls. The information encompasses, as shown in FIG. 2 for example, a "call ID" that is information for discrimination of a currently connected packet call, a "release timer" that indicates a residual time up to a release of the packet call, a "connected number of calls" that indicates the number of currently connected packet calls, etc.

The exchanger 40, connected to radio network controller 30, performs an exchange process relative to a setup request of packet call transferred from the radio network controller 30. The exchanger 40 is connected via a trunk network 100 to other exchangers.

Figure 3:
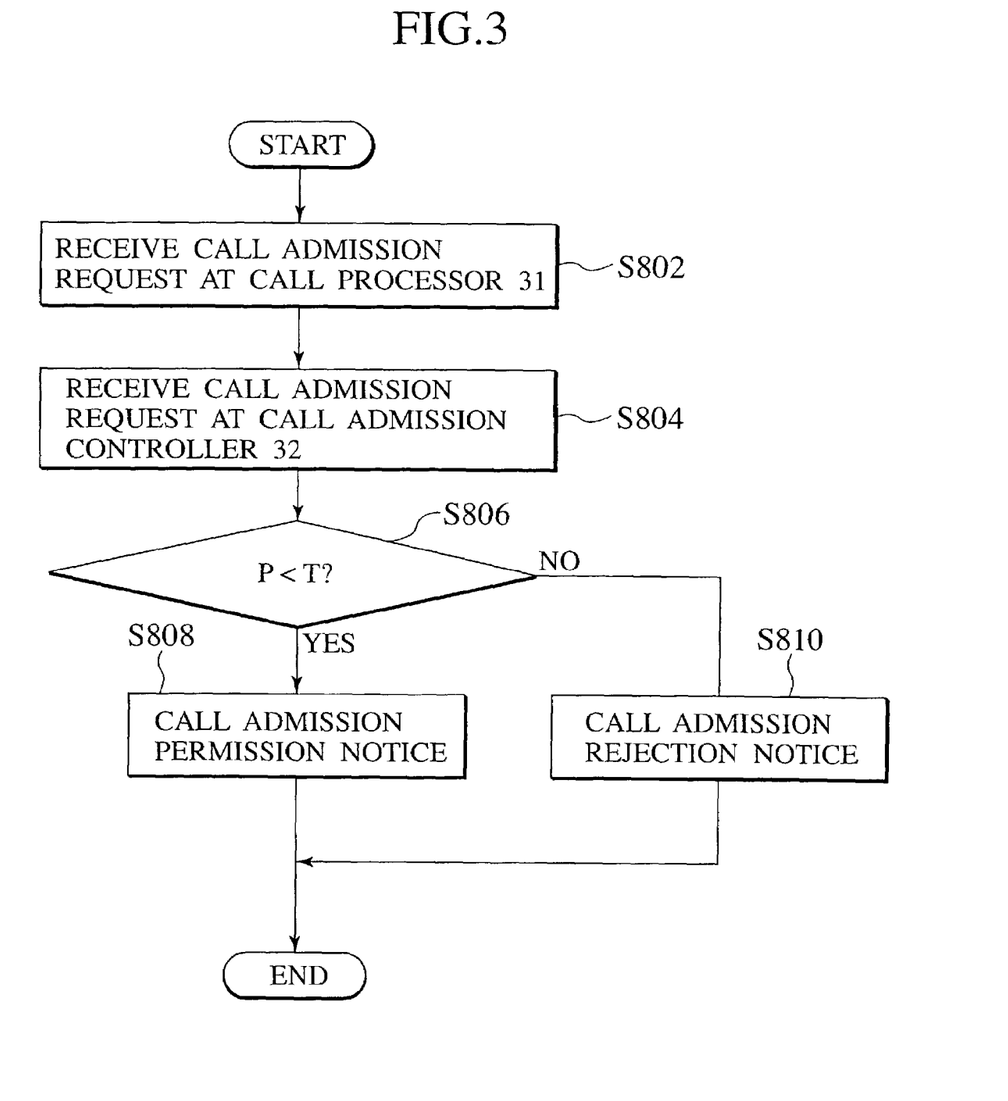
FIG. 3 is a flow chart of actions of the mobile packet communications system according to conventional art.

FIG. 3 shows actions to be taken when a call admission request is transmitted from a mobile station 10 in the mobile packet communications system described.

As shown in FIG. 3, at a step S802, the call processor 31 of a radio network controller 30 receives a call admission request transmitted from the mobile station 10 via a radio base station 20. At a step S804, the call admission controller 32 of the radio network controller 30 receives the call admission request transferred from the call processor 31.

At a step S806, the call admission controller 32 compares a magnitude of "down-link transmission power P", which is periodically reported from the radio base station 20 as in current use at the radio base station 20, with a "prescribed threshold T" under own control.

If the "down-link transmission power P" is smaller than the "prescribed threshold T", the flow of control goes to a step S808, where the call admission controller 32 transmits to the call processor 31 a "call admission permission notice" notifying an admission of packet call to be effected for the above-noted call admission request, and stores in the memory 33 information on a call associated with the call admission request.

Unless the "down-link transmission power P" is smaller than the "prescribed threshold T", the flow goes to a step S810, where the call admission controller 32 transmits to the call processor 31 a "call admission rejection notice" notifying no admission of packet call to be effected for the above-noted call admission request. The call processor 31 is responsible for the "call admission permission notice" or "call admission rejection notice" transmitted from the call admission controller 32 to execute a necessary process relative to the call admission request from the mobile station 10.

In the mobile packet communications system described, however, a controller for setting a circuit-switching-oriented call (voice call) is applied to the setup of packet call as well, with an occasional failure to exhibit an expected effect.

For example, for a radio base station 20 that has many mobile stations 10 performing radio communications in places relatively vicinal thereto and can do with a small amount of down-link transmission power P to be used there, the call admission controller 32 of an associated radio network controller 30 may admit setup admission of an excessive number of packet calls, with the result that an increased transmission delay causes a degraded quality, as a problem under the above-noted condition in the mobile packet communications system described.

In the case of a radio base station 20 has many mobile stations 10 performing radio communications in places relatively distant therefrom, the above-noted problem does not occur due to control depending on the down-link transmission power P. In such situation, however, a single radio channel may undergo a time division to be commonly employed by a plurality of users, leading to a failure to well utilize such an advantage of mobile packet communications that users are allowed to perform radio communications unless their data have temporal overlaps even when a great magnitude of down-link transmission power P is used at the radio base station 20. As a result, a problem that a reduced throughput over an entirety of the mobile packet communications system occurs.

BRIEF SUMMARY OF THE INVENTION

It is an object of this invention to provide a mobile packet communications system, allowing for utilization of the above-noted advantage of mobile packet communications to have an improved efficiency in use of radio channel resources, while limiting increase in transmission delay to prevent degradation of quality.

According to a first aspect of this invention, a mobile packet communications system comprises a memory configured to store information on currently set packet calls, a new call decider implemented, upon reception of a setup request of a packet call transmitted from a mobile station, to make a decision depending on the information stored in the memory, as to whether or not the packet call setup-requested is a new call, and an admission concluder implemented, upon a decision for the packet call to be the new call, to conclude whether or not to admit the packet call.

A mobile packet communications system according to the first aspect of this invention may preferably have the memory configured to store a number of the currently set packet calls, and the admission concluder implemented to sample the number of the currently set packet calls, and to give a conclusion as to whether or not to admit the packet call depending on the sampled number of the currently set packet calls.

A mobile packet communications system of a W-CDMA system configured with a mobile packet communications system according to the first aspect of this invention may preferably have the memory configured to store a number of currently set A-DPCH's, and the admission concluder implemented to sample the number of the currently set A-DPCH's, and to give a conclusion as to whether or not to admit the packet call depending on the sampled number of the currently set A-DPCH's.

A mobile packet communications system according to the first aspect of this invention may preferably comprise a buffer configured to store data addressed and transmitted to the currently set packet calls, and a queue processor implemented to transfer onto the packet call the data stored in the buffer, measuring an amount of data transferred onto the packet call per unit time, and have the admission concluder implemented to give a conclusion as to whether or not to admit the packet call depending on the amount of data measured at the queue processor.

A mobile packet communications system according to the first aspect of this invention may preferably comprise a buffer configured to store data addressed and transmitted to the currently set packet calls, a queue processor implemented to transfer onto the packet call the data stored in the buffer, a delay time calculator implemented to calculate a delay time depending on a time when the data is stored in the buffer and a time when the data is transferred onto the packet call by the queue processor, and a delay time averager implemented to determine an average within a prescribed interval with respect to the delay time calculated by the delay time calculator, and have the admission concluder is implemented to give a conclusion as to whether or not to admit the packet call depending on the average determined by the delay time averager.

According to a second aspect of this invention, a mobile packet communications method comprises the steps of making, upon reception of a setup request of a packet call transmitted from a mobile station, a decision depending on information on currently set packet calls stored in a memory, as to whether or not the packet call setup-requested is a new call, and concluding, upon a decision for the packet call to be the new call, whether or not to admit the packet call.

A mobile packet communications method according to the second aspect of this invention may preferably have the concluding comprising sampling a number of the currently set packet calls from the memory, and giving a conclusion as to whether or not to admit the packet call depending on the sampled number of the currently set packet calls.

A mobile packet communications method of a W-CDMA system implemented with a mobile packet communications method according to the second aspect of this invention may preferably have the concluding comprising sampling a number of currently set A-DPCH's from the memory, and giving a conclusion as to whether or not to admit the packet call depending on the sampled number of the currently set A-DPCH's.

A mobile packet communications method according to the second aspect of this invention may preferably comprise the steps of storing in a buffer data addressed and transmitted to the currently set packet calls, and transferring onto the packet call the data stored in the buffer, measuring an amount of data transferred onto the packet call per unit time, and have the concluding comprising giving a conclusion as to whether or not to admit the packet call depending on the measured amount of data.

A mobile packet communications method according to the second aspect of this invention may preferably comprise the steps of storing in a buffer data addressed and transmitted to the currently set packet calls, transferring onto the packet call the data stored in the buffer, calculating a delay time depending on a time when the data is stored in the buffer and a time when the data is transferred onto the packet call, and determining an average within a prescribed interval with respect to the calculated delay time, and have the concluding comprising giving a conclusion as to whether or not to admit the packet call depending on the determined average.

DETAILED DESCRIPTION OF THE INVENTION (Configuration of a Mobile Packet Communications System According to an Embodiment)

There will be detailed below embodiments of the invention with reference to the drawings. FIG. 1 shows an example of an entire configuration of a mobile packet communications system according to this embodiment of the invention, as a diagram simply taken of part associated with the invention.

The entire configuration of the mobile packet communications system according to the embodiment is analogous to that of the conventional mobile packet communications system described. The mobile packet communications system according to the embodiment includes mobile stations 10, radio network controllers 30, and an exchanger 40 analogous to those employed in the conventional mobile packet communications system.

In the mobile packet communications system according to the embodiment, radio network controller 30 is configured, like the conventional mobile packet communications system, for connections to the exchanger 40 and to radio base stations 20, and for controlling the radio base stations 20 to control radio communications of mobile stations 10. Further, in the mobile packet communications system according to the embodiment, radio network controller 30 is configured to receive a "call admission request (setup request of packet call)" from a mobile station 10, as it is transmitted via a radio base station 20, and to make a decision of whether or not to admit packet call for the admission request, and upon a decision for admission of packet call, to transfer to the exchanger 40 a request for the setup of packet call.

Figure 4:
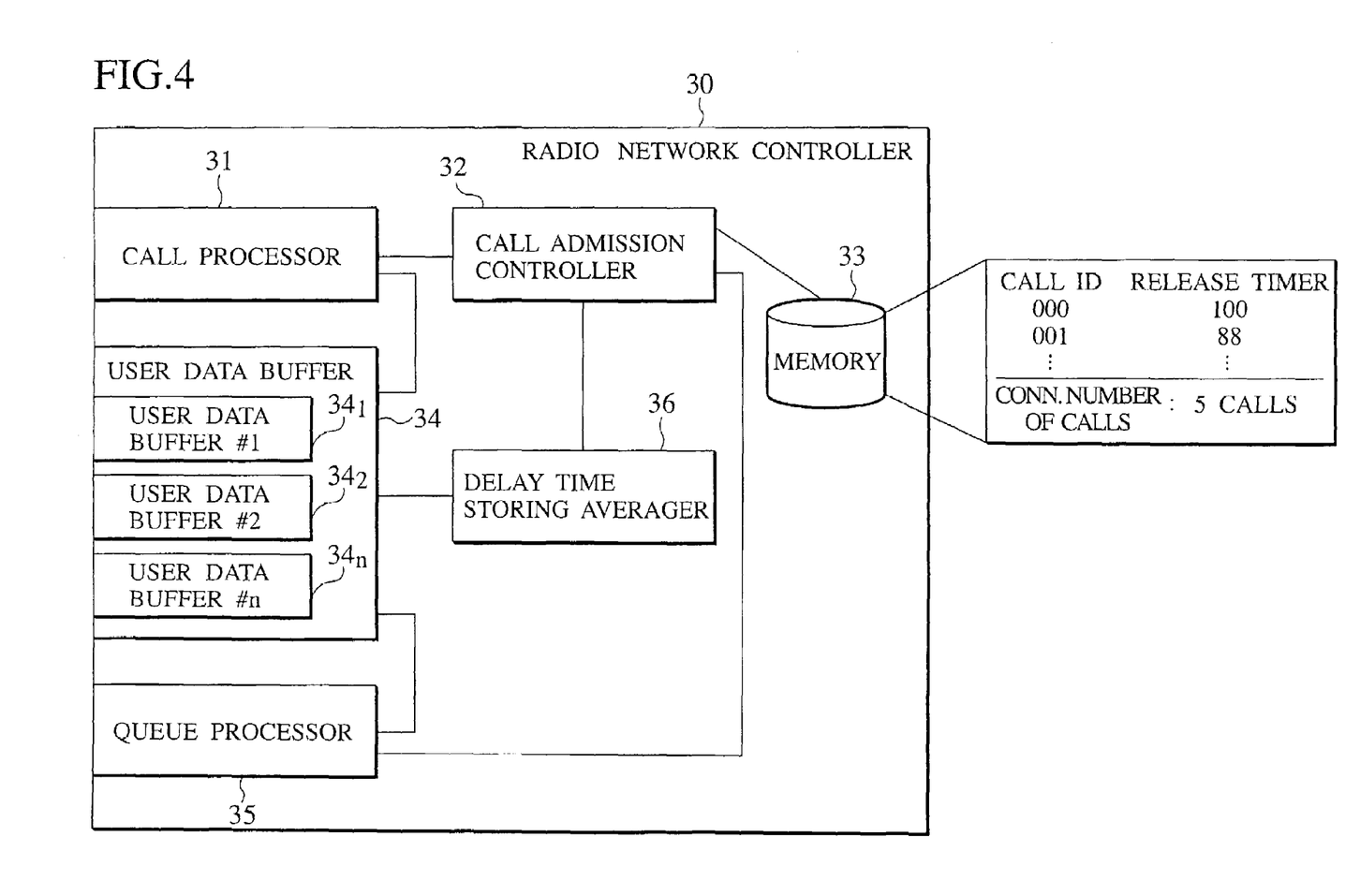
FIG. 4 is a functional block diagram of a radio network controller of a mobile packet communications system according to an embodiment of the invention.

FIG. 1 shows an example of configuration of a radio network controller 30 of the mobile packet communications system according to the embodiment, as a diagram simply taken of part the radio network controller 30 associated with the invention. In the mobile packet communications system according to the embodiment, as shown in FIG. 4, radio network controller 30 is configured with a call processor 31, a call admission controller 32, a memory 33, a user data buffer 34, a queue processor 35, and a delay time storing averager 36.

The call processor 31, connected to the call admission controller 32 and the user data buffer 34, is implemented to receive a call admission request from mobile station 10 and transfer the received call admission request to the call admission controller 32. The call processor 31 is further implemented to answer the mobile station 10 of a result of a decision transmitted from the call admission controller 32 as to whether or not to admit packet call for the above-noted call admission request.

The call processor 31 is implemented, as the setup of packet call is admitted (with a packet call connected relative to the mobile station 10), to order the user data buffer 34 to have a region set for the admitted packet call (i.e. the mobile station 10), and when the connection of packet call is released, to order the user data buffer 34 to release a region that has been dedicated as the region for the packet call (mobile station 10).

In application of the mobile packet communications system according to the embodiment to a mobile packet communications network of a W-CDMA system, the call processor 31 is implemented to transmit to the radio bases station 20 a setup or release order of an A-DPCH (associated dedicated physical channel) in accordance with an instruction from the call admission controller 32.

The call admission controller 32, connected to the call processor 31, the memory 33, the user data buffer 34, the queue processor 35, and the delay tme storing averager 36, is configured as a new call decider implemented, upon reception of a "call admission request (a setup request of a packet call)" transmitted from a mobile station 10, to make a decision depending on whether or not it is stored in the memory 33 as a currently set packet call, as to whether or not the packet call associated with the above-noted call admission request is a "new call (that is a packet call not currently set)".

The call admission controller 32 is further configured as an admission concluder implemented to give a conclusion as to whether or not to admit the packet call associated with the call admission request transferred from the call processor 31, and to transmit a result of the conclusion to the call processor 31.

The call admission controller 32 is implemented to release the connection of a packet call of which a "release timer" stored in the memory 33 is time out (that is, a value of the "release timer" has become "0"), updating information on the packet call in the memory 33.

In application of the mobile packet communications system according to the embodiment to a mobile packet communications network of a W-CDMA system, the call admission controller 32 is implemented to control setup and release of an A-DPCH, updating information on the number of connections of A-DPCH's in the memory 33 in accordance with the setup and release of the A-DPCH.

The memory 33, connected to the call admission controller 32, is configured to serve as a memory for storing therein information on currently set packet calls. The information encompasses, as shown in FIG. 4 for example, a "call ID" that is information for discrimination of a currently connected packet call, the "release timer" that indicates a residual time up to a release of the packet call, a "connected number of calls" that indicates the number of currently connected packet calls, etc.

In application of the mobile packet communications system according to the embodiment to a mobile packet communications network of a W-CDMA system, the memory 33 is implemented to store the number of connections of current A-DPCH's.

The user data buffer 34, connected to the call processor 31, the queue processor 35, and the delay time storing averager 36, is configured to have a region secured every currently set packet call (mobile station 10 with a packet call set therefor), serving as a buffer to store, for a temporary interval of time before transmission to a radio base station 20, a data (packet) addressed and transmitted, every set packet call (mobile station 10), from the exchanger 40 to the packet call. In this embodiment, as shown in FIG. 4, the user data buffer 34 is configured with a total of n user data buffers #1 to #n for adaptation to have secured regions for n mobile stations 10.

The user data buffer 34 is implemented to store the time when a transmitted data from exchanger 40 to packet call (mobile station 10) is stored and the time when the data is transferred to the radio base station 20 (or the time when the data is read by the queue processor 35), and to transmit a difference therebetween as a delay time to the delay time storing averager 36. The region to be secured and released at the user data buffer 34 is controlled by an order transmitted from the call processor 31 in accordance with an instruction from the call admission controller 32.

The queue processor 35, connected to the call admission controller 32, the user data buffer 34, and the delay time storing averager 36, is configured as a queue processor for reading, every set packet call (mobile station 10), the data stored in the user data buffer 34, transferring the read data to the radio base station 20 on the packet call.

The queue processor 35 is implemented to count (measure) the amount of data transmitted to the radio base station 20 per unit time, periodically transmitting a result of the count to the call admission controller 32. The result of count is assumed as a throughput of the mobile packet communications system according to the embodiment.

The delay time storing averager 36, connected to the call admission controller 32 and the user data buffer 34, is configured as a delay time storing averager for determining an average within a prescribed interval with respect to the delay time transmitted from the user data buffer 34, to transmit an average of delay time thus determined to the call admission controller 32.

(Actions of Mobile Packet Communications System According to the Embodiment)

As actions of a mobile packet communications system according to the embodiment, there are four methods shown in FIG. 5 to FIG. 8. FIG. 5 to FIG. 8 are diagrammatic flowcharts showing sequences to be followed upon reception of a call admission request from a mobile station 10 in the mobile packet communications system according to the embodiment, as examples taken simply in part associated with the invention.

(First Sequence)

Figure 5:
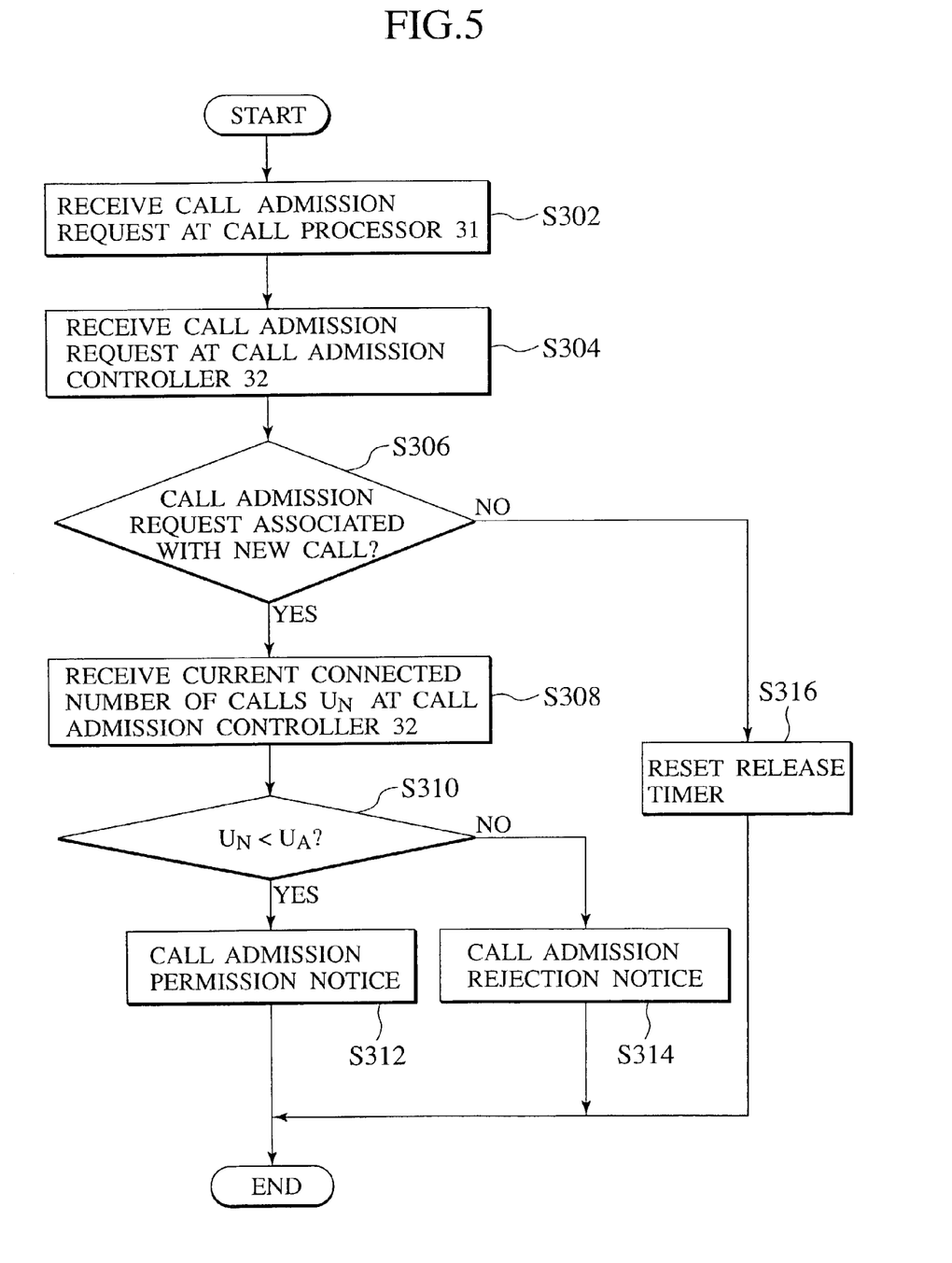
FIG. 5 is a flow chart of actions of a mobile packet communications system according to an embodiment of the invention.

As shown in FIG. 5, at a step S302, the call processor 31 of a radio network controller 30 receives a call admission request transmitted from a mobile station 10 via a radio base station 20. At a step S304, the call admission controller 32 of the radio network controller 30 receives the call admission request transferred from the call processor 31.

At a step S306, the call admission controller 32 retrieves whether or not a packet call associated with the above-noted call admission request is stored as a currently set packet call in the memory 33.

If the packet call associated with the call admission request is stored as a currently set packet call in the memory 33, the call admission controller 32 recognizes the packet call as an "existing call (i.e., currently set packet call)", and the flow of control goes to a step S316, where a "release timer" associated with the packet call in the memory 33 is set (reset) to a maximum. Then, the action of mobile packet communications system according to this embodiment goes to an end.

Unless the packet call associated with the call admission request is stored as a currently set packet call in the memory 33, the call admission controller 32 recognizes the packet call as a "new call (i.e., packet call not currently set)", and the flow of control goes to a step S308.

At the step S308, the call admission controller 32 samples from the memory 33 a "connected number of calls UN" that indicates the number of currently set packet calls. Then, at a step S310, the call admission controller 32 compares the sampled "connected number of calls UN" with a "prescribed threshold UA" under own control, where the "prescribed threshold UA" is a prescribed upper limit in number of concurrently settable packet calls.

If the "connected number of calls UN" is smaller than the "prescribed threshold UA", the flow goes to a step S312, where the call admission controller 32 gives a conclusion to admit the packet call associated with the above-noted call admission request, and transmits to the call processor 31 a "call admission permission notice" as a notice of the effect, storing in the memory 33 information on the packet call associated with the call admission request, updating the content of storage in the memory 33.

Unless the "connected number of calls UN" is smaller than the "prescribed threshold UA", the flow goes to a step S314, where the call admission controller 32 gives a conclusion not to admit the packet call associated with the above-noted call admission request, and transmits to the call processor 31 a "call admission rejection notice" as a notice of the effect. The call processor 31 is responsible for the "call admission permission notice" or "call admission rejection notice" transmitted from the call admission controller 32 to execute a necessary process relative to the call admission request from the mobile station 10.

(Second Sequence)

The second sequence is for a mobile packet communications system according to this embodiment, as it is applied to a mobile packet communications network using a W-CDMA system. For this sequence, it is assumed that the number of set packet calls (mobile stations 10) in the mobile packet communications network of W-CDMA system is substantially equivalent to the number of DPCH's (A-DPCH's) accompanying radio channels for the packet calls (mobile stations 10).

Figure 6:
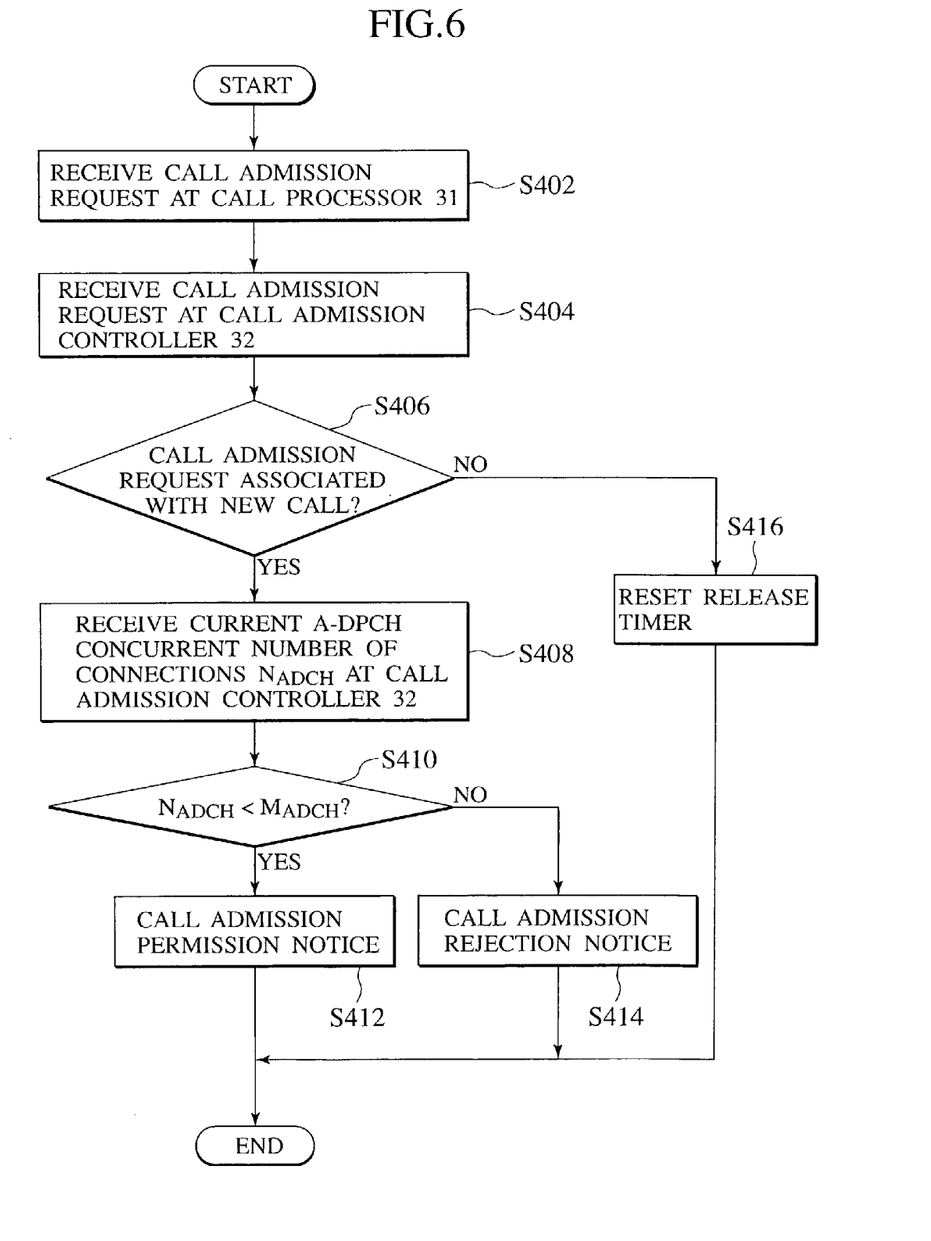
FIG. 6 is a flow chart of actions of a mobile packet communications system according to an embodiment of the invention.

As shown in FIG. 6, at a step S402, the call processor 31 of a radio network controller 30 receives a call admission request transmitted from a mobile station 10 via a radio base station 20. At a step S404, the call admission controller 32 of the radio network controller 30 receives the call admission request transferred from the call processor 31.

At a step S406, the call admission controller 32 retrieves whether or not a packet call associated with the above-noted call admission request is stored as a currently set packet call in the memory 33.

If the packet call associated with the call admission request is stored as a currently set packet call in the memory 33, the call admission controller 32 recognizes the packet call as an "existing call (i.e., currently set packet call)", and the flow of control goes to a step S416, where a "release timer" associated with the packet call in the memory 33 is set (reset) to a maximum. Then, the action of mobile packet communications system according to this embodiment goes to an end.

Unless the packet call associated with the call admission request is stored as a currently set packet call in the memory 33, the call admission controller 32 recognizes the packet call as a "new call (i.e., packet call not currently set)", and the flow of control goes to a step S408.

At the step S408, the call admission controller 32 samples from the memory 33 an "A-DPCH concurrent number of connections $N_{A\text{-}DPCH}$" that indicates the number of currently set A-DPCH's. Then, at a step S410, the call admission controller 32 compares the sampled "A-DPCH concurrent number of connections $N_{A\text{-}DPCH}$" with a "prescribed threshold $M_{A\text{-}DPCH}$" under own control, where the "prescribed threshold $M_{A\text{-}DPCH}$" is a prescribed upper limit in number of concurrently settable A-DPCH's.

If the "A-DPCH concurrent number of connections $N_{A\text{-}DPCH}$" is smaller than the "prescribed threshold $M_{A\text{-}DPCH}$", the flow goes to a step S412, where the call admission controller 32 gives a conclusion to admit the packet call associated with the above-noted call admission request, and transmits to the call processor 31 a "call admission permission notice" as a notice of the effect, storing in the memory 33 information on the packet call associated with the call admission request, updating the content of storage in the memory 33.

Unless the "A-DPCH concurrent number of connections $N_{A\text{-}DPCH}$" is smaller than the "prescribed threshold $M_{A\text{-}DPCH}$", the flow goes to a step S414, where the call admission controller 32 gives a conclusion not to admit the packet call associated with the above-noted call admission request, and transmits to the call processor 31 a "call admission rejection notice" as a notice of the effect. The call processor 31 is responsible for the "call admission permission notice" or "call admission rejection notice" transmitted from the call admission controller 32 to execute a necessary process relative to the call admission request from the mobile station 10.

(Third Sequence)

Figure 7:
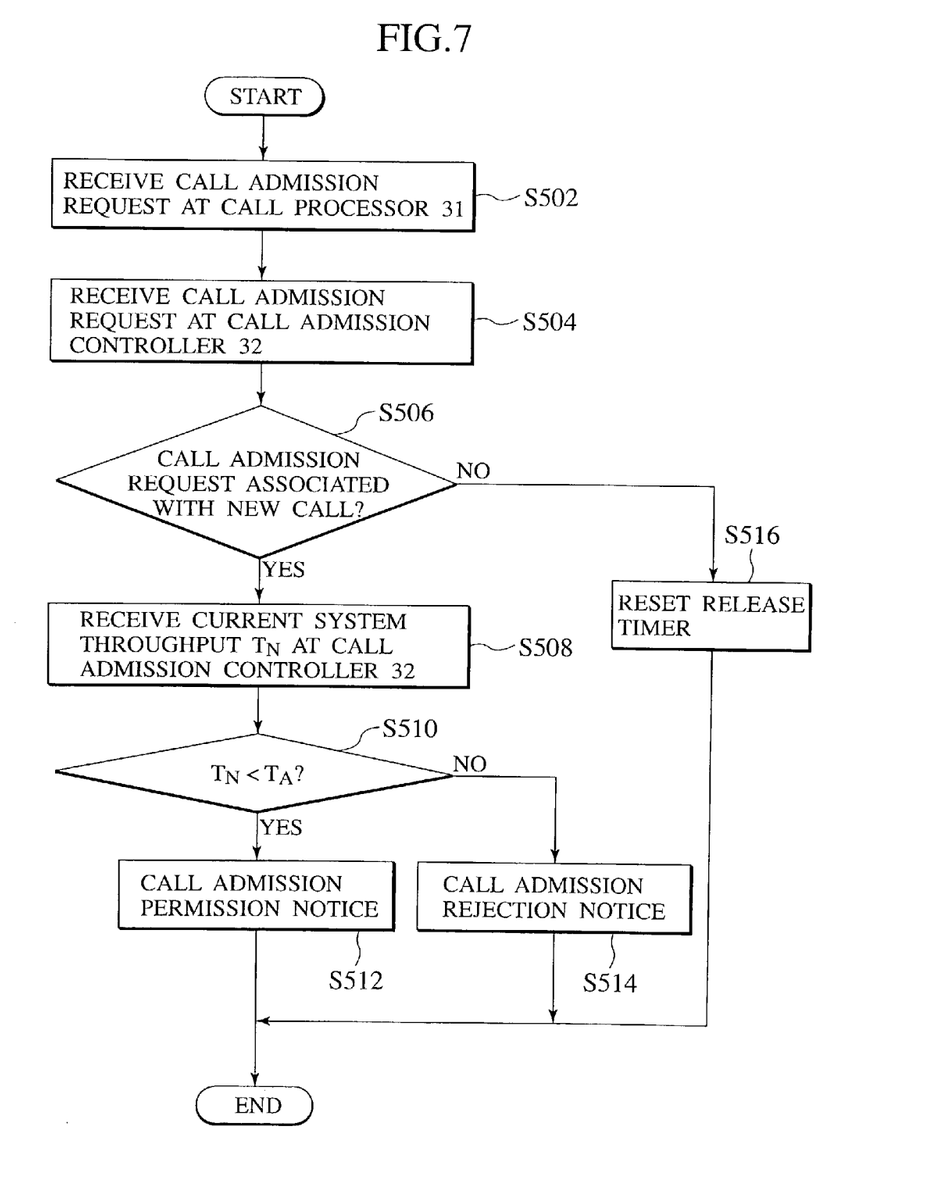
FIG. 7 is a flow chart of actions of a mobile packet communications system according to an embodiment of the invention.

As shown in FIG. 7, at a step S502, the call processor 31 of a radio network controller 30 receives a call admission request transmitted from a mobile station 10 via a radio base station 20. At a step S504, the call admission controller 32 of the radio network controller 30 receives the call admission request transferred from the call processor 31.

At a step S506, the call admission controller 32 retrieves whether or not a packet call associated with the above-noted call admission request is stored as a currently set packet call in the memory 33.

If the packet call associated with the call admission request is stored as a currently set packet call in the memory 33, the call admission controller 32 recognizes the packet call as an "existing call (i.e., currently set packet call)", and the flow of control goes to a step S516, where a "release timer" associated with the packet call in the memory 33 is set (reset) to a maximum. Then, the action of mobile packet communications system according to this embodiment goes to an end.

Unless the packet call associated with the call admission request is stored as a currently set packet call in the memory 33, the call admission controller 32 recognizes the packet call as a "new call (i.e., packet call not currently set)", and the flow of control goes to a step S508.

At the step S508, the call admission controller 32 determines a "current system throughput TN" based on a result of count periodically transmitted from the queue processor 35. Then, at a step S510, the call admission controller 32 compares the determined "current system throughput TN" with a "prescribed threshold TA" under own control, where the "prescribed threshold TA" is a prescribed upper limit of throughput per unit time.

If the "current system throughput TN" is smaller than the "prescribed threshold TA", the flow goes to a step S512, where the call admission controller 32 gives a conclusion to admit the packet call associated with the above-noted call admission request, and transmits to the call processor 31 a "call admission permission notice" as a notice of the effect, storing in the memory 33 information on the packet call associated with the call admission request, updating the content of storage in the memory 33.

Unless the "current system throughput TN" is smaller than the "prescribed threshold TA", the flow goes to a step S514, where the call admission controller 32 gives a conclusion not to admit the packet call associated with the above-noted call admission request, and transmits to the call processor 31 a "call admission rejection notice" as a notice of the effect. The call processor 31 is responsible for the "call admission permission notice" or "call admission rejection notice" transmitted from the call admission controller 32 to execute a necessary process relative to the call admission request from the mobile station 10.

(Fourth Sequence)

Figure 8:
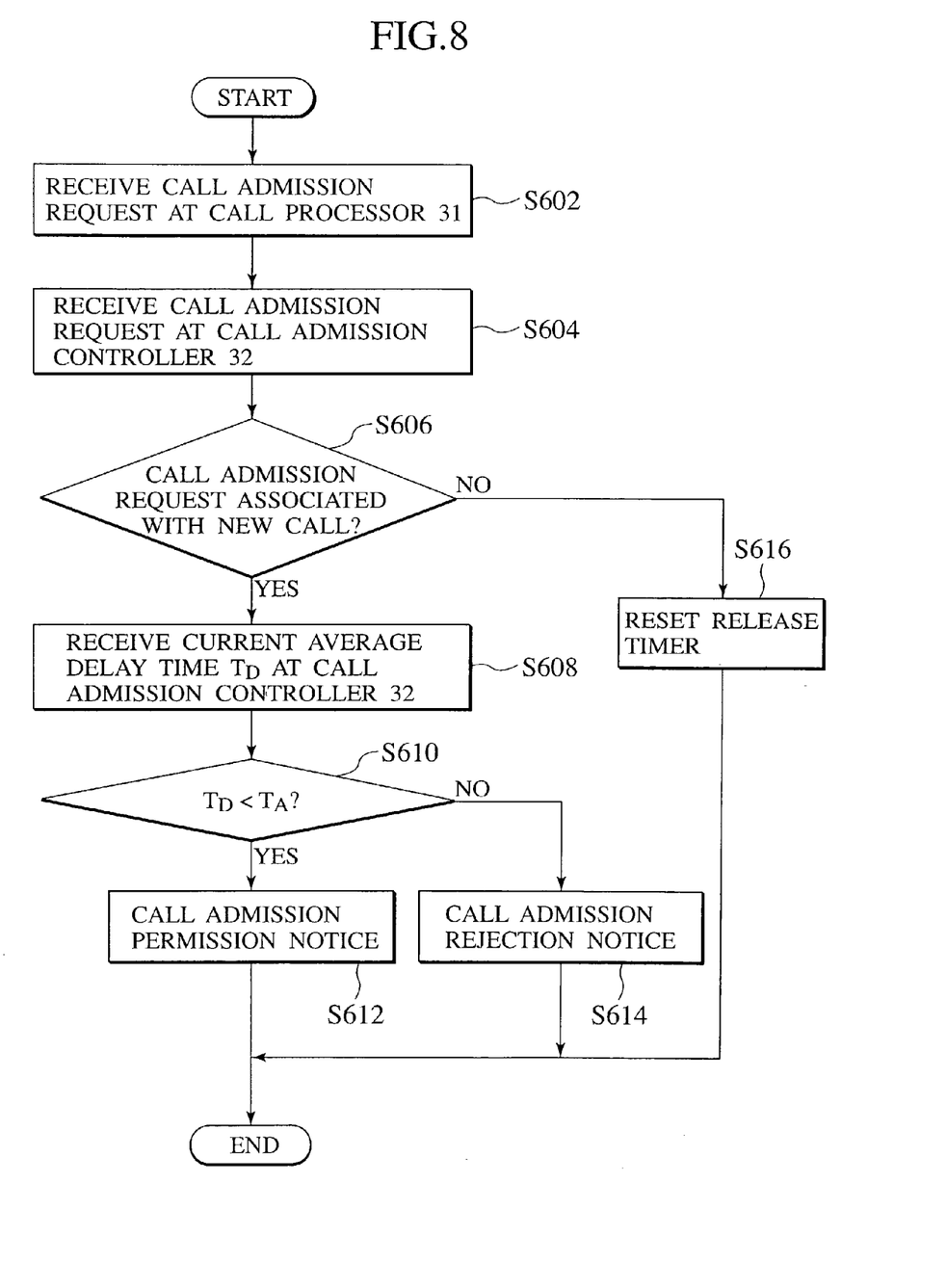
FIG. 8 is a flow chart of actions of a mobile packet communications system according to an embodiment of the invention.

As shown in FIG. 8, at a step S602, the call processor 31 of a radio network controller 30 receives a call admission request transmitted from a mobile station 10 via a radio base station 20. At a step S604, the call admission controller 32 of the radio network controller 30 receives the call admission request transferred from the call processor 31.

At a step S606, the call admission controller 32 retrieves whether or not a packet call associated with the above-noted call admission request is stored as a currently set packet call in the memory 33.

If the packet call associated with the call admission request is stored as a currently set packet call in the memory 33, the call admission controller 32 recognizes the packet call as an "existing call (i.e., currently set packet call)", and the flow of control goes to a step S616, where a "release timer" associated with the packet call in the memory 33 is set (reset) to a maximum. Then, the action of mobile packet communications system according to this embodiment goes to an end.

Unless the packet call associated with the call admission request is stored as a currently set packet call in the memory 33, the call admission controller 32 recognizes the packet call as a "new call (i.e., packet call not currently set)", and the flow of control goes to a step S608.

At the step S608, the call admission controller 32 determines a "current average delay time TD" based on the delay time transmitted from the delay time storing averager 36. Then, at a step S610, the call admission controller 32 compares the determined "current average delay time TD" with a "prescribed threshold AD" under own control, where the "prescribed threshold TD" is a prescribed upper limit of permissible delay time.

If the "current average delay time TD" is smaller than the "prescribed threshold AD", the flow goes to a step S612, where the call admission controller 32 gives a conclusion to admit the packet call associated with the above-noted call admission request, and transmits to the call processor 31 a "call admission permission notice" as a notice of the effect, storing in the memory 33 information on the packet call associated with the call admission request, updating the content of storage in the memory 33.

Unless the "current average delay time TD" is smaller than the "prescribed threshold AD", the flow goes to a step S614, where the call admission controller 32 gives a conclusion not to admit the packet call associated with the above-noted call admission request, and transmits to the call processor 31 a "call admission rejection notice" as a notice of the effect. The call processor 31 is responsible for the "call admission permission notice" or "call admission rejection notice" transmitted from the call admission controller 32 to execute a necessary process relative to the call admission request from the mobile station 10.

(Other Embodiments)

The foregoing embodiments may also be modified in various manners within the scope of appended claims, as the modifications fall within a scope of technical concept recited in the claims.

(Effects and Functions of Mobile Packet Communications Systems According to the Embodiment)

According to the embodiment described, in a mobile packet communications system, a call admission controller 32 is adapted to make a decision depending on information stored in a memory 33, as to whether or not a setup-requested packet call is a new call, and to give a conclusion as to whether or not to admit the packet call, simply in respect of new calls excepting existing calls.

According to the embodiment described, in a mobile packet communications system, a call admission controller 32 is adapted to give a conclusion depending on a "connected number of calls UN" as the number of currently set packet calls, as to whether or not to admit the packet call, thus overcoming the problem that an excessive number of packet calls might otherwise have been admitted even when many mobile stations 10 perform radio communications in places relatively vicinal to a radio base station 20.

According to the embodiment described, in a mobile packet communications system, a call admission controller 32 is adapted to give a conclusion depending on a "connected number of calls UN" as the number of currently set packet calls, as to whether or not to admit the packet call, thus allowing for utilization of an advantage of mobile packet communications that users are allowed to perform radio communications unless their data have temporal overlaps even when many mobile stations 10 perform radio communications in places relatively distant from a radio base station 20, overcoming the problem that the throughput of an entirety of the mobile packet communications system might otherwise have been reduced.

According to the embodiment described, in a mobile packet communications system, a call admission controller 32 is adapted to give a conclusion depending on an "A-DPCH concurrent number of connections $N_{A\text{-}DPCH}$" as the number of currently set A-DPCH's to be substantially equivalent to the number of currently set packet calls, as to whether or not to admit the packet call, thus overcoming the problem that an excessive number of packet calls might otherwise have been admitted even when many mobile stations 10 perform radio communications in places relatively vicinal to a radio base station 20.

According to the embodiment described, in a mobile packet communications system, a call admission controller 32 is adapted to give a conclusion depending on an "A-DPCH concurrent number of connections $N_{A\text{-}DPCH}$" as the number of currently set A-DPCH's to be substantially equivalent to the number of currently set packet calls, as to whether or not to admit the packet call, thus allowing for utilization of an advantage of mobile packet communications that users are allowed to perform radio communications unless their data have temporal overlaps even when many mobile stations 10 perform radio communications in places relatively distant from a radio base station 20, overcoming the problem that the throughput of an entirety of the mobile packet communications system might otherwise have been reduced.

According to the embodiment described, in a mobile packet communications system, a call admission controller 32 is adapted to give a conclusion depending on a "current system throughput TN" as the amount of data measured by a queue processor 35, as to whether or not to admit the packet call, thus preventing occurrences of an increased delay time due to reduced throughput even when many mobile stations 10 perform radio communications in places relatively vicinal to a radio base station 20.

According to the embodiment described, in a mobile packet communications system, a call admission controller 32 is adapted to give a conclusion depending on a "current average delay time TD" as an average within a prescribed interval with respect to a delay time calculated by combination of a user data buffer 34 and a delay time storing averager 36, as to whether or not to admit the packet call, thus preventing increase in delay time even when many mobile stations 10 perform radio communications in places relatively vicinal to a radio base station 20.

As will be seen from the foregoing description, according to the invention, there can be provided a mobile packet communications system, allowing for utilization of advantage of mobile packet communications to have an improved efficiency in use of radio channel resources, while limiting increase in transmission delay to prevent degradation of quality.

While preferred embodiments of the present invention have been described using specific terms, such description is not given in any restrictive sense, but for illustrative purposes, and it is to be understood that changes and variations may be made without departing from the spirit or scope of the following claims.

What is claimed is:

1. A mobile packet communications system comprising:
   a memory configured to store information on currently set packet calls;
   a new call decider implemented, upon reception of a setup request of a packet call transmitted from a mobile station, to make a decision depending on the information stored in the memory, as to whether or not the packet call setup-requested is a new call; and
   an admission concluder implemented, upon a decision for the packet call to be the new call, to conclude whether or not to admit the packet call, wherein
   the memory is configured to store a number of the currently set packet calls, and
   the admission concluder is implemented to sample the number of the currently set packet calls, and to give a conclusion as to whether or not to admit the packet call depending on the sampled number of the currently set packet calls.

2. A mobile packet communications system comprising:
   a memory configured to store information on currently set packet calls;

a new call decider implemented, upon reception of a setup request of a packet call transmitted from a mobile station, to make a decision depending on the information stored in the memory, as to whether or not the packet call setup-requested is a new call; and an admission concluder implemented, upon a decision for the packet call to be the new call, to conclude whether or not to admit the packet call, wherein the memory is configured to store a number of currently set A-DPCH's, and the admission concluder is implemented to sample the number of the currently set A-DPCH's, and to give a conclusion as to whether or not to admit the packet call depending on the sampled number of the currently set A-DPCH's.

3. A mobile packet communications system comprising:

a memory configured to store information on currently set packet calls;

a new call decider implemented, upon reception of a setup request of a packet call transmitted from a mobile station, to make a decision depending on the information stored in the memory, as to whether or not the packet call setup-requested is a new call; and an admission concluder implemented, upon a decision for the packet call to be the new call, to conclude whether or not to admit the packet call, comprising:

a buffer configured to store data addressed and transmitted to the currently set packet calls; and a queue processor implemented to transfer onto the packet call the data stored in the buffer, measuring an amount of data transferred onto the packet call per unit time, wherein the admission concluder is implemented to give a conclusion as to whether or not to admit the packet call depending on the amount of data measured at the queue processor.

4. A mobile packet communications system comprising:

a memory configured to store information on currently set packet calls;

a new call decider implemented, upon reception of a setup request of a packet call transmitted from a mobile station, to make a decision depending on the information stored in the memory, as to whether or not the packet call setup-requested is a new call; and an admission concluder implemented, upon a decision for the packet call to be the new call, to conclude whether or not to admit the packet call, comprising:

a buffer configured to store data addressed and transmitted to the currently set packet calls;

a queue processor implemented to transfer onto the packet call the data stored in the buffer;

a delay time calculator implemented to calculate a delay time depending on a time when the data is stored in the buffer and a time when the data is transferred onto the packet call by the queue processor, and a delay time averager implemented to determine an average within a prescribed interval with respect to the delay time calculated by the delay time calculator, wherein the admission concluder is implemented to give a conclusion as to whether or not to admit the packet call depending on the average determined by the delay time averager.

5. A mobile packet communications method comprising the steps of:

making, upon reception of a setup request of a packet call transmitted from a mobile station, a decision depending on information on currently set packet calls stored in a memory, as to whether or not the packet call setup-requested is a new call; and concluding, upon a decision for the packet call to be the new call, whether or not to admit the packet call, wherein the concluding comprises:

sampling a number of the currently set packet calls from the memory; and giving a conclusion as to whether or not to admit the packet call depending on the sampled number of the currently set packet calls.

6. A mobile packet communications method comprising the steps of:

making, upon reception of a setup request of a packet call transmitted from a mobile station, a decision depending on information on currently set packet calls stored in a memory, as to whether or not the packet call setup-requested is a new call; and concluding, upon a decision for the packet call to be the new call, whether or not to admit the packet call, wherein the concluding comprises:

sampling a number of currently set A-DPCH's from the memory; and giving a conclusion as to whether or not to admit the packet call depending on the sampled number of the currently set A-DPCH's.

7. A mobile packet communications method comprising the steps of:

making, upon reception of a setup request of a packet call transmitted from a mobile station, a decision depending on information on currently set packet calls stored in a memory, as to whether or not the packet call setup-requested is a new call; and concluding, upon a decision for the packet call to be the new call, whether or not to admit the packet call, comprising the steps of:

storing in a buffer data addressed and transmitted to the currently set packet calls; and transferring onto the packet call the data stored in the buffer, measuring an amount of data transferred onto the packet call per unit time, wherein the concluding comprises giving a conclusion as to whether or not to admit the packet call depending on the measured amount of data.

8. A mobile packet communications method comprising the steps of:

making, upon reception of a setup request of a packet call transmitted from a mobile station, a decision depending on information on currently set packet calls stored in a memory, as to whether or not the packet call setup-requested is a new call; and concluding, upon a decision for the packet call to be the new call, whether or not to admit the packet call, comprising the steps of:

storing in a buffer data addressed and transmitted to the currently set packet calls;

transferring onto the packet call the data stored in the buffer;

calculating a delay time depending on a time when the data is stored in the buffer and a time when the data is transferred onto the packet call; and determining an average within a prescribed interval with respect to the calculated delay time, wherein the concluding comprises giving a conclusion as to whether or not to admit the packet call depending on the determined average.

9. A radio network controller for a mobile packet communications system comprising:

a memory configured to store information on currently set packet call;

a new call decider implemented, upon reception of a setup request of a packet call transmitted from a mobile station, to make a decision depending on the information stored in the memory, as to whether or not the packet call setup-requested is a new call; and an admission concluder implemented, upon a decision for the packet call to be the new call, to conclude whether or not to admit the packet call, wherein the memory is configured to store a number of the currently set packet calls, and the admission concluder is implemented to sample the number of the currently set packet calls, and to give a conclusion as to whether or not to admit the packet call depending on the sampled number of the currently set packet calls.

10. A radio network controller for a mobile packet communications system comprising:

a memory configured to store information on currently set packet calls;

a new call decider implemented, upon reception of a setup request of a packet call transmitted from a mobile station, to make a decision depending on the information stored in the memory, as to whether or not the packet call setup-requested is a new call; and an admission concluder implemented, upon a decision for the packet call to be the new call, to conclude whether or not to admit the packet call, wherein the memory is configured to store a number of currently set A-DPCH's, and the admission concluder is implemented to sample the number of the currently set A-DPCH's, and to give a conclusion as to whether or not to admit the packet call depending on the sampled number of the currently set A-DPCH's.

11. A radio network controller for a mobile packet communications system comprising:

a memory configured to store information on currently set packet calls;

a new call decider implemented, upon reception of a setup request of a packet call transmitted from a mobile station, to make a decision depending on the information stored in the memory, as to whether or not the packet call setup-requested is a new call; and an admission concluder implemented, upon a decision for the packet call to be the new call, to conclude whether or not to admit the packet call, comprising:

a buffer configured to store data addressed and transmitted to the currently set packet calls; and a queue processor implemented to transfer onto the packet call the data stored in the buffer, measuring an amount of data transferred onto the packet call per unit time, wherein the admission concluder is implemented to give a conclusion as to whether or not to admit the packet call depending on the amount of data measured at the queue processor.

12. A radio network controller for a mobile packet communications system comprising:

a memory configured to store information on currently set packet calls;

a new call decider implemented, upon reception of a setup request of a packet call transmitted from a mobile station, to make a decision depending on the information stored in the memory, as to whether or not the packet call setup-requested is a new call; and an admission concluder implemented, upon a decision for the packet call to be the new call, to conclude whether or not to admit the packet call, comprising:

a buffer configured to store data addressed and transmitted to the currently set packet calls;

a queue processor implemented to transfer onto the packet call the data stored in the buffer;

a delay time calculator implemented to calculate a delay time depending on a time when the data is stored in the buffer and a time when the data is transferred onto the packet call by the queue processor, and a delay time averager implemented to determine an average within a prescribed interval with respect to the delay time calculated by the delay time calculator, wherein the admission concluder is implemented to give a conclusion as to whether or not to admit the packet call depending on the average determined by the delay time averager.

* * * * *